June 30, 1964 W. GELLER 3,139,538

SAWTOOTH CURRENT GENERATOR EMPLOYING R.C. NETWORK AND DIODE EFFECTING LOW POWER LOSS IN CIRCUIT

Filed Jan. 11, 1962

INVENTOR
WILLIAM GELLER
BY Theodore Jay Jr
ATTORNEY

United States Patent Office 3,139,538

Patented June 30, 1964

3,139,538

SAWTOOTH CURRENT GENERATOR EMPLOYING R.C. NETWORK AND DIODE EFFECTING LOW POWER LOSS IN CIRCUIT

William Geller, Plainview, N.Y., assignor, by mesne assignments, to Sylvania Electric Products Inc., a corporation of Delaware Filed Jan. 11, 1962, Ser. No. 174,641

5 Claims. (Cl. 307—88.5)

Figure 1:
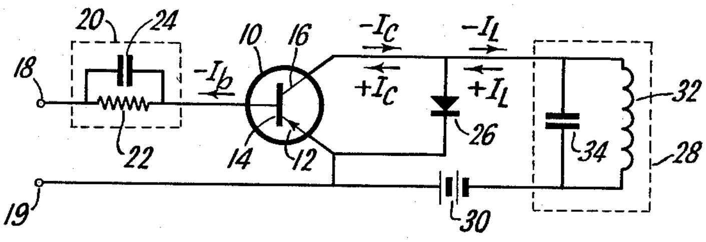

My invention is directed toward sawtooth current generators for producing current pulses having a sawtooth waveform.

This application is a continuation-in-part of my application Serial No. 788,818, filed January 26, 1959, now abandoned. Sawtooth current generators are widely employed in the horizontal deflection circuits of television receivers. In these receivers, the horizontal deflection circuit usually consumes a large percentage of the total supplied power. This loss of energy can be tolerated in conventional receivers using electron tubes but, in low power and portable battery operated transistorized receivers, it is essential that the power consumption be reduced to a minimum. Accordingly, I have invented an improved sawtooth current generator having low power loss.

It is an object of my invention to produce a highly efficient sawtooth current generator particularly suitable for controlling the magnetic deflection of an electron beam in a cathode ray tube.

Another object is to provide a new type of sawtooth current generator wherein the power losses are sharply decreased and the circuit efficiency is correspondingly enhanced.

In accordance with the principles of my invention, a sawtooth current generator is provided which comprises a transistor having first, second, and third electrodes. A resistance-capacitance network is coupled between the first and second electrodes of the transistor and rectifying means is coupled between the first and third electrodes of the transistor. A resonant load, including an inductance, is also coupled between the first and third electrodes of the transistor.

In one embodiment of my invention, the first, second and third electrodes of the transistor correspond to the emitter, base, and collector respectively of the transistor and the resistance-capacitance network consists of a resistor and capacitor connected in parallel. The time constant of the resistance-capacitance network is made relatively low, the capacitor substantially discharging during the retrace period of the sawtooth current. This is in contradistinction to known sawtooth generators in which a resistance-capacitance network having a large time constant is connected in series with the base electrode to provide self bias for the transistor.

A voltage pulse train having a fixed recurrence frequency is connected in series with the resistance-capacitance network and the base-emitter path of the transistor. The pulse train has an average value of zero, being positive for an interval corresponding to the retrace period and negative during the trace period of the sawtooth output current flowing through the inductance. More particularly, during the trace period the output current changes linearly with time from an initial maximum value of one polarity to a terminal maximum value of opposite polarity. During the retrace period in which the input pulse is positive, the output current, varying sinusoidally, changes monotonically from the terminal value back to the initial value.

The transistor is triggered into an electrically non-conductive state when the input pulse is positive and into an electrically conductive state when the input pulse is negative. However, unless additional drive power is supplied to the circuit, the transistor requires an appreciable time interval (the switching transient) to change its electric state and power losses occur during each switching transient. The rectifier, which can be triggered into either a conductive or non-conductive state substantially instantaneously serves to partially reduce the power losses without increasing drive power by short circuiting the collector and emitter during the transient period wherein the transistor changes from the non-conductive state to the conductive state.

In addition, a substantially larger reduction in power loss is obtained through the use of the low time constant resistance-capacitance network in conjunction with the rectifier. After the initial switching transient, the transistor becomes conductive and current flows through it in the reverse direction; i.e. from collector to emitter in a type PNP transistor or emitter to collector in a type NPN. At this time, the network capacitor effectively short-circuits the network resistor providing additional base drive which lowers the resistance of the emitter-collector path for the reverse current. Since the resistance of the rectifier is several times greater than the emitter-collector resistance of the transistor in its saturated state, the effect of the capacitor is to decrease the losses in the circuit by increasing the time interval during which the transistor conducts fully. As the transistor current increases, the network capacitor is charged and the network resistor limits the base current to a value just within saturation. By driving the transistor in this manner, the storage time is minimized and the time required for the collector current to go to zero at the end of the trace is reduced resulting in a further reduction in power loss.

Figure 2:
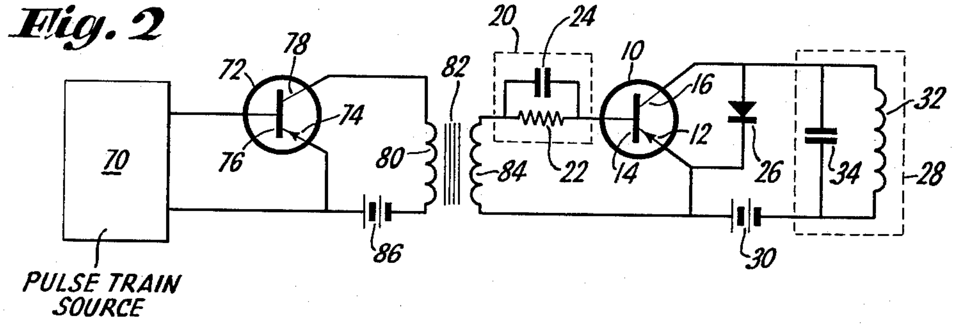

Illustrative embodiments of my invention will now be described with reference to the accompanying drawings wherein:

FIGS. 1 and 2 are circuit diagrams; and

FIGS. *3a–3f* are waveforms of various currents and voltages as utilized in the circuits of FIGS. 1 and 2.

Referring now to FIG. 1, the base electrode 14 of a transistor 10 (in this example a PNP transistor commercially designated as a 2N174) is connected through a network 20 to input terminal 18. Network 20 comprises a capacitor 24 shunted by a resistor 22. The emitter electrode 12 of transistor 10 is directly connected to input terminal 19 and is also connected through battery 30 and a resonant circuit 28 to the collector electrode 16 of transistor 10. (Alternatively, network 20 can be interposed between terminal 19 and the emitter 12 and terminal 18 can be connected directed to the base electrode 14). A diode 26 is connected between the emitter and collector electrodes of transistor 10 and is poled to permit current flow in the forward direction from the end connected to the collector to the end connected to the emitter.

The resonant circuit 28 is constituted by an inductance, in this example yoke 32, and a capacitor 34. (Capacitor 34 can be a physically separate component or can represent the stray capacitance of the yoke 32.) The resonant circuit 28 is tuned to a selected frequency $F_0$ (for example 40 kilocycles per second) and hence has an oscillatory period $T_0=1/F_0$. The time constant of network 20 has a value which is somewhat less than one half of the period $T_0$.

An input signal, having a negative value between pulses (FIG. *3a*), is applied between input terminals 18 and 19 thereby maintaining transistor 10 in a normally conductive state. The transistor is triggered into the non-conductive state each time the input pulse applied between input terminals 18 and 19 goes positive.

Before discussing the operation of the circuit of FIG. 1, it is believed necessary to discuss briefly the characteristics of the transistor 10. When a transistor is operated in its conventional forward direction (with respect to collector to emitter voltages and base current), for sufficiently low values of collector to emitter voltage, the collector current increases rapidly at a constant rate as the collector to emitter voltage increases. (This region of voltage values is normally defined as the saturation region.) Under these conditions, the transistor can be regarded as a closed electrical switch, wherein an impedance of the order of one ohm or less exists between the collector and emitter. It is, however, possible to reverse the direction of current flow between the emitter and collector; in other words, the transistor can be so operated that the electrode designated as a collector functions as an emitter, and the electrode designated as an emitter functions as a collector. Under these conditions, there will again be a region of collector to emitter voltage values wherein the transistor functions as a closed switch having an extremely low impedance. In this latter case, a somewhat larger base current is required to maintain the same saturation condition as when the transistor is conducting in its conventional forward direction. In the embodiment disclosed in this invention, the collector to emitter voltages are so chosen that the transistor, when conductive, is always in its low impedance state.

Figure 3:
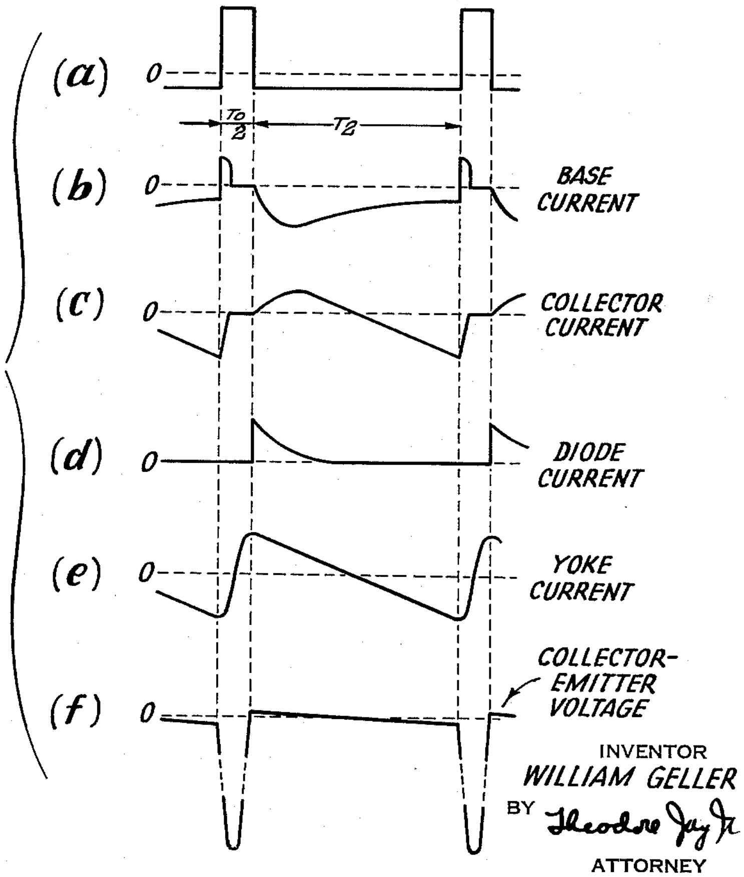

The circuit of FIG. 1 functions in the following manner. A pulse train having a fixed recurrence frequency and thus containing equidistantly spaced pulses (FIG. 3*a*) is supplied to the input terminals. This pulse train has an average value of zero, being positive for a duration of $T_0/2$ and negative for a duration $T_2$. Typical values for $T_0/2$ and $T_2$ are 12.5 and 51 microseconds respectively. Each time a positive pulse is received at the input terminals 18 and 19, the transistor 10 is rendered non-conductive. During each time interval $T_2$ between pulses, the transistor first requires a transient period to switch from the non-conductive state to the conductive state. The transient period is represented in FIG. 3*c* by the short interval required for the collector current (originally at zero because of the non-conductive state of the transistor) to increase to its maximum positive value. During this transient period, the diode 26 conducts, effectively connecting battery 30 directly across yoke 32. As soon as the transistor is rendered conductive, a circuit is completed through the emitter and collector which also connects battery 30 and inductor 32. The resistance of the transistor 10, when conducting, is much lower than the resistance of the diode 26, when conducting. Thus, after transistor 10 is fully conductive, effectively all of the current flows through the battery, transistor and inductance 32 and substantially no current flows through the diode 26 (as shown in FIG. 3*d*). Hence during each period $T_2$, yoke 32 is effectively connected across battery 30. Under these conditions, the constant quantity $L\,di/dt$ is equal to the battery voltage, where L is the inductance of the yoke and $di/dt$ is the time rate of change of current flowing through yoke 32. Since $di/dt$ is a constant, the current flowing through the yoke 32 changes linearly with time and, as shown in FIG. 3*e*, decreases from an initial maximum positive value to a terminal negative maximum value. Thus, the current flowing through yoke 32 during each period $T_2$ exhibits a sawtooth waveform.

At the midpoint of the period $T_2$, the yoke current passes through a zero value and the direction of the current flow between the emitter and collector of the transistor 10 is reversed. During the second half of each period $T_2$, the transistor is conducting in its designated manner, i.e., the electrode designated as an emitter functions as the emitter. During the first half of each period $T_2$, the electrode designated as the emitter actually functions as the collector. Under these conditions, a larger value of base current is required than is required for the second half of the period $T_2$. The additional base drive is obtained through the action of the capacitor 24 in network 20. During the initial portion of the period $T_2$ the capacitor acts to short circuit resistance 22 and the base current is increased (FIG. 3*b*); during the second portion of the cycle, capacitor 24 charges and the base current is reduced through the action of resistor 22. Resistor 22 then limits the base current to a point just within saturation at which the arrival of an incoming pulse rapidly triggers the transistor into its non-conductive state, the switching transient thus produced being represented by the small positive peaks of the base current as shown in FIG. 3*b*. Illustrative values for capacitor 24 and resistor 22 and 1.0 microfarad and 10 ohms respectively.

Further, the resonant circuit 28 swings through a half cycle of sinusoidal oscillation, the duration of which is $T_0/2$. The current flowing through yoke 32 thus swings sinusoidally and monotonically from the maximum negative value to the maximum positive value (FIG. 3*e*). When a yoke having an inductance of about 150 microhenries is used, the peak to peak sawtooth current can be about 5 amperes. In the absence of resistor 22, the base current at the end of each interval $T_2$ would be more than sufficient to maintain the transistor in the saturation region. Under these conditions, a storage time interval will ensue between the time the collector current starts to increase from its negative maximum value (FIG. 3*c*) and the time at which the incoming pulses produce the collector-emitter voltage pulses (FIG. 3*f*). This storage interval would result in increased power losses. As can be seen from FIGS. 3*c* and 3*f*, use of the resistor 22 effectively eliminates the storage interval and hence eliminates the power losses which would otherwise be produced.

Referring now to FIG. 2, incoming equidistantly spaced pulses are amplified in a type PNP transistor 72 having an emitter 74, a base 76, and a collector 78 and thereafter appear across the primary winding 80 of transformer 82. A direct voltage source 86 is connected between winding 80 and the emitter of transistor 72. The secondary winding 84 of this transformer is connected between the network 20 and the emitter of transistor 10. By this means the input pulses are supplied to the circuit of FIG. 1.

As many changes could be made in the above described construction and many different embodiments could be made without departing from the scope thereof, it is intended that all matter contained in the above description or shown in the accompanying drawings shall be interpreted as illustrative and not in a limiting sense.

What is claimed is:

1. A generator for producing a sawtooth current waveform having trace and retrace portions comprising
   (*a*) a transistor having first, second, and third electrodes,
   (*b*) a resistance-capacitance network coupled between the first and second electrodes of said transistor, the time constant of said resistance-capacitance network having a value whereby said capacitor substantially discharges during the retrace portion of said sawtooth current waveform,
   (*c*) rectifying means coupled between the first and third electrodes of said transistor, and
   (*d*) an inductance coupled between the first and third electrodes of said transistor.

2. A generator for producing a sawtooth current waveform having trace and retrace portions comprising
   (*a*) first and second input terminals,
   (*b*) a transistor having first, second and third electrodes, the first electrode of said transistor being coupled to said first input terminal,
   (*c*) resistance-capacitance means coupled between the second electrode of said transistor and said second input terminal, the time constant of said resistance-capacitance network having a value whereby said capacitor substantially discharges during the retrace portion of said sawtooth current waveform,
   (*d*) rectifying means coupled between the first and third electrodes of said transistor, and
   (*e*) an output circuit coupled between the first and third electrodes of said transistor, said output circuit including an inductance.

3. A generator for producing a sawtooth current waveform having trace and retrace portions comprising (*a*) first and second input terminals, (*b*) a transistor having first, second and third electrodes, the first electrode of said transistor being coupled to said first input terminal, (*c*) a resistance-capacitance network including a capacitor connected in parallel with a resistor coupled between the second electrode of said transistor and said second input terminal, the time constant of said resistance-capacitance network having a value whereby said capacitor substantially discharges during the retrace portion of said sawtooth current waveform, (*d*) a rectifier coupled between the first and third electrodes of said transistor, and (*e*) a parallel resonant circuit including an inductance coupled between the first and third electrodes of said transistor, the current through said inductance having a sawtooth waveform when a pulse train having a fixed recurrence frequency is applied to said input terminals.

4. A generator for producing a sawtooth current waveform having trace and retrace portions comprising (*a*) first and second input terminals, (*b*) a transistor having emitter, base, and collector electrodes, the emitter of said electrode being coupled to said first input terminal, (*c*) a resistance-capacitance network including a capacitor connected in parallel with a resistor coupled between the base electrode of said transistor and said second input terminal, the time constant of said resistance-capacitance network having a value whereby said capacitor substantially discharges during the retrace portion of said sawtooth current waveform, (*d*) a rectifier having first and second ends connected to the collector and emitter of said transistor respectively, said rectifier being poled for forward current flow from said first to said second end, and (*e*) a parallel resonant circuit including an inductance coupled between the emitter and collector electrodes of said transistor, the current through said inductance having a sawtooth waveform when a pulse train having a fixed recurrence frequency is applied to said input terminals.

5. A generator for producing a sawtooth current waveform having trace and retrace portions comprising (*a*) a transistor having emitter, base and collector electrodes, (*b*) a resistance-capacitance network including a capacitor connected in parallel with a resistor, the time constant of said resistance-capacitance network having a value whereby said capacitor substantially discharges during the retrace portion of said sawtooth current waveform, (*c*) an input circuit connected in series with said resistance-capacitance network, said input circuit and said network being coupled between the emitter and base electrodes of said transistor, (*d*) a rectifier having first and second ends connected to the collector and emitter of said transistor respectively, said rectifier being poled for forward current flow from said first to said second end, (*e*) an output circuit coupled between the emitter and collector electrodes of said transistor, said output circuit including in series connection a voltage source and a parallel resonant circuit having a period $T_0$, said resonant circuit including an inductance, and (*f*) means to supply a pulse train of fixed recurrence frequency to said input circuit, each pulse in said train having a duration of $T_0/2$, the current flowing through said inductance in the presence of an input pulse varying sinusoidally and monotonically from an initial value to a terminal value, said current in the absence of a pulse having a sawtooth waveform and changing from said terminal value to said initial value in each period $T_2$.

References Cited in the file of this patent

UNITED STATES PATENTS

| | | |
|---|---|---|
| 2,747,136 | Herzog | May 22, 1956 |
| 2,921,231 | Preisig | Jan. 12, 1960 |